United States Patent [19]

Fischer

[11] 4,057,074
[45] Nov. 8, 1977

[54] BIDIRECTIONAL PISTON VALVE

[75] Inventor: Harry C. Fischer, Oak Ridge, Tenn.

[73] Assignee: The United States of America as represented by the United States Energy Research and Development Administration, Washington, D.C.

[21] Appl. No.: 717,431

[22] Filed: Aug. 24, 1976

[51] Int. Cl.² .............................................. G05D 7/00
[52] U.S. Cl. .................................................. 137/107
[58] Field of Search ................ 137/102, 107, 493.9; 91/442; 251/76, 77, 63.4

[56] References Cited

U.S. PATENT DOCUMENTS

| 1,373,599 | 4/1921 | Clark | 251/63.4 |
| 2,538,806 | 1/1951 | St. Clair | 251/63.4 |
| 2,892,468 | 6/1959 | Beuchle | 251/77 |
| 3,196,891 | 7/1965 | Valentine | 137/102 |
| 3,519,011 | 7/1970 | Pennanen | 137/102 |
| 3,608,859 | 9/1971 | Hetzer | 251/63.4 |
| 3,653,722 | 4/1972 | Klimek | 137/102 |
| 3,769,997 | 11/1973 | Hardwick et al. | 137/102 |
| 3,799,185 | 3/1974 | Milnes et al. | 137/102 |
| 3,834,837 | 9/1974 | Nickell | 137/102 |
| 3,845,932 | 11/1974 | Fontaine | 251/63.4 |

FOREIGN PATENT DOCUMENTS 224,047  12/1968  U.S.S.R. ............................ 137/102

*Primary Examiner*—William R. Cline
*Assistant Examiner*—H. Jay Spiegel
*Attorney, Agent, or Firm*—Dean E. Carlson; Stephen D. Hamel; Fred O. Lewis

[57] ABSTRACT

This invention is a reversing valve having an inlet, an outlet, and an inlet-outlet port. The valve is designed to respond to the introduction of relatively high-pressure fluid at its inlet or, alternatively, of lower-pressure fluid at its inlet-outlet port. The valve includes an axially slidable assembly which is spring-biased to a position where it isolates the inlet and connects the inlet-outlet port to the outlet. The admission of high-pressure fluid to the inlet displaces the slidable assembly to a position where the outlet is isolated and the inlet is connected to the inlet-outlet port. The valve is designed to minimize pressure drops and leakage. It is of a reliable and comparatively simple design.

5 Claims, 3 Drawing Figures

BIDIRECTIONAL PISTON VALVE

BACKGROUND OF THE INVENTION

This invention was made in the course of, or under, a contract with the Energy Research and Development Administration.

The invention relates generally to bidirectional-flow valves, or reversing valves. More particularly, it relates to valves in which pressure applied by a process fluid positions a reversible, slidable assembly to effect closing and opening of the valve ports.

This valve was designed particularly for use in a system of the kind shown in simplified form in FIG. 1. As will be described, the system is designed to circulate a refrigerant through a closed loop to alternately warm and cool certain evaporator elements. The system includes a compressor 1, a condenser 3, and pairs of similar components, as follows: solenoid valves 5 and 5'; special bidirectional-flow valves 11 and 11'; evaporators 13 and 13'; check valves 17 and 17'; and expansion valves 15 and 15', which are controlled respectively by temperature-responsive elements 16 and 16'. Each of the evaporators may comprise a plurality of parallel-connected ice-making plates provided with means (not shown) for spraying water thereon when desired. With the exception of the reversible valves 11 and 11', all of the components may be of conventional design.

Briefly, the operation of the system shown in FIG. 1 is as follows. The compressor 1 discharges hot, gaseous refrigerant to the condenser 3, from which the refrigerant flows as a relatively warm and high-pressure liquid. Assuming that solenoid valve 5 is open and that solenoid valve 5' closed, the discharge from the condenser flows to the suction line 9 of the compressor through a loop 10, the flow being in the direction indicated by solid arrows. That is, the warm, high-pressure liquid from the condenser enters bidirectional valve 11, which directs it through evaporator 13, thus dislodging ice which was formed on the evaporator during a preceding freezing cycle. The high-pressure liquid discharge from the evaporator flows through check valve 17, bypassing the expansion valve 15 and flowing through expansion valve 15'. The liquid and chilled gas outflow from the expansion valve flows through evaporator 13', forming ice on the exterior thereof. The relatively cold and low-pressure gas from 13' enters bidirectional valve 11', which directs it into the compressor suction line 9.

In the succeeding cycle, a control circuit (not shown) closes solenoid valve 5 and opens solenoid valve 5', reversing the flow of refrigerant through loop 10, the flow now being in the direction of the dashed arrows. In this cycle, the input to bidirectional valve 11' is warm, high-pressure liquid from the condenser 3. Valve 11' directs this flow through evaporator 13', dislodging ice formed thereon during the cycle just described. The outflow from the evaporator 13' flows through check valve 17' and then through expansion valve 15 and evaporator 13, freezing ice on the exterior of the latter. As indicated, the low-pressure gas discharge from evaporator 13 enters valve 11, which directs it into the compressor suction line 9.

A system of the kind illustrated in FIG. 1 may contain many parallel-connected loops 10 and may thus require many bidirectional valves 5 and 5'. In accordance with this invention, each of the valves 5 and 5' is of a special design to be described below. The new design combines the advantages of leak-free operation and low pressure drops. In addition, the new valve is of relatively simple construction, is compact, and is comparatively inexpensive.

SUMMARY OF THE INVENTION

It is an object of this invention to provide a bidirectional-flow valve of novel design.

It is another object to provide a compact and comparatively inexpensive bidirectional-flow valve characterized by leak-free operation and operation with low pressure drops.

It is another object to provide a valve having an inlet, an outlet, and inlet-outlet port and a slidable piston assembly, the slidable assembly being adapted to connect the inlet to the inlet-outlet port when high-pressure fluid is introduced to the inlet and to connect the inlet-outlet port to the outlet when lower-pressure fluid is introduced to the inlet-outlet port.

The invention may be summarized as follows: A valve comprising a housing provided with an inlet port and an outlet port having a common axis and also provided with an inlet-outlet port defining a valve seat; a piston slidably fitted in said housing for movement along said axis and partitioning said housing into a first compartment including said inlet port and a second compartment including said outlet port and valve seat, the head of said piston confronting said inlet port and being formed with an axial passage communicating with a discharge port in the sidewall of the stem of said piston; a valve disc assembly carried by said piston, said assembly including a hub portion slidably engaging said stem and including a disc for sealably engaging said seat; means carried by said piston for resiliently biasing said disc assembly outwardly away from the piston head; and means carried by said piston for limiting the outward movement of said disc assembly to a position where said hub portion sealably covers said discharge port, whereby admission to said inlet port of fluid at a selected pressure moves said piston toward said seat to a position where engagement of said disc assembly and said seat displaces said assembly inwardly along said stem and uncovers said discharge port.

DESCRIPTION OF THE PREFERRED EMBODIMENT

Figure 2:
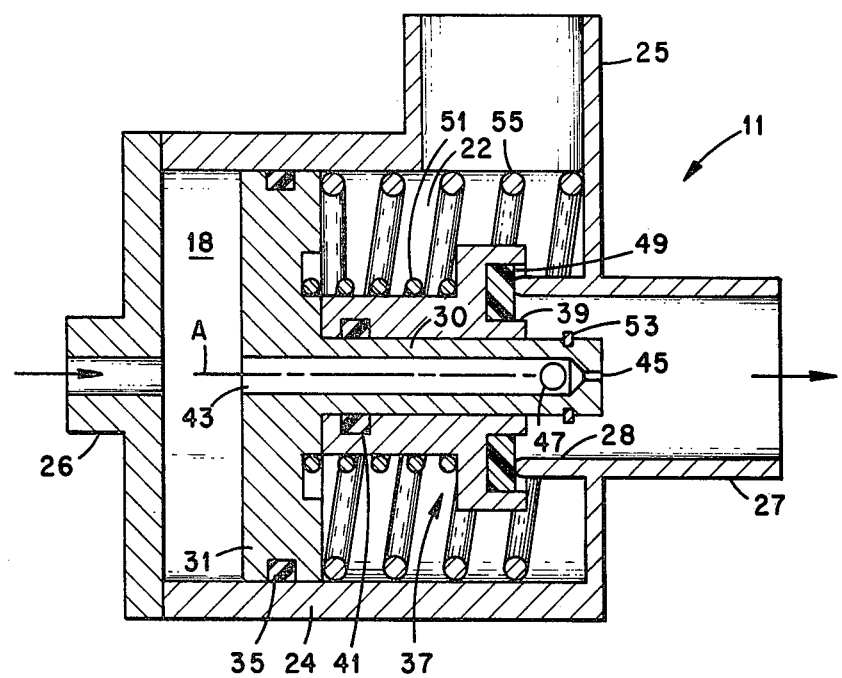
FIG. 2 is a longitudinal central section of a bidirectional-flow valve of the kind designated as 11 in FIG. 1. The valve is shown in the position resulting from the application of high-pressure fluid to a valve inlet 26.
Figure 3:
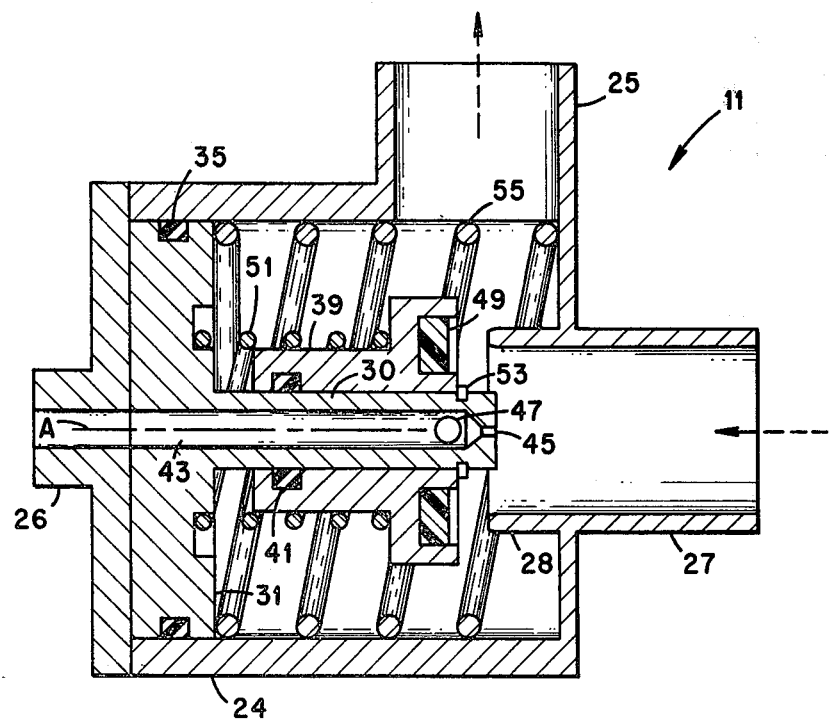
FIG. 3 is a similar view of the valve shown in the position it assumes when there is no input to the inlet 26.

Referring to FIGS. 2 and 3, the invention is illustrated in terms of bidirectional-flow valve 11, which includes a tubular housing 24 having an outlet 25. The housing also has an inlet 26 disposed about the same axis A as an inlet-outlet port 27. As shown, the port 27 defines a valve seat 28 disposed about axis A. A piston 31 is fitted in the housing between the inlet 25 and port 27 for slidable movement along axis A. The head of the piston confronts the inlet 26 and carries a circumferential sealing ring 35 for engagement with the wall of the housing. When in the position shown in FIG. 2, the piston head partitions the housing into a first compartment 18, which is in direct communication with the inlet 26, and a second compartment 22, which is in direct communication with outlet 25 and port 27. The piston 31 is formed with an axial passage 43 which extends through the head of the piston and into its stem, where it communicates with a discharge port 47 formed in the sidewall of the stem. In the particular embodiment shown, the passage 43 terminates in a very small bleed passage 45 extending through the end of the stem.

The stem 30 carries a valve disc assembly 37 having a hub portion 39 which slidably engages the stem and is sealed thereto by means of a sealing ring 41. The assembly 37 includes a valve disc 49, composed of Teflon or other suitable material, for sealable engagement with the aforementioned valve seat 28. A helical spring 51 is mounted between the disc assembly and the head of the piston to bias the disc assembly outward (away from the piston head) to a position (see FIG. 3) where the hub portion 39 engages a ring 53, or other suitable stop, carried by the stem. In the biased position, the hub portion sealably covers the discharge port 47 as shown in FIG. 3. In the illustrated form of the valve 11, a helical spring 55 is mounted between the housing 24 and the piston head to bias the slidable piston-and-disc assembly to the end of the housing containing the inlet 26—i.e., to the position shown in FIG. 3. As shown in that figure, the spacing between the piston head and the stop 53 is preselected so that when the slidable assembly is in the biased position, the valve disc 49 is spaced from its seat 28.

Figure 1:
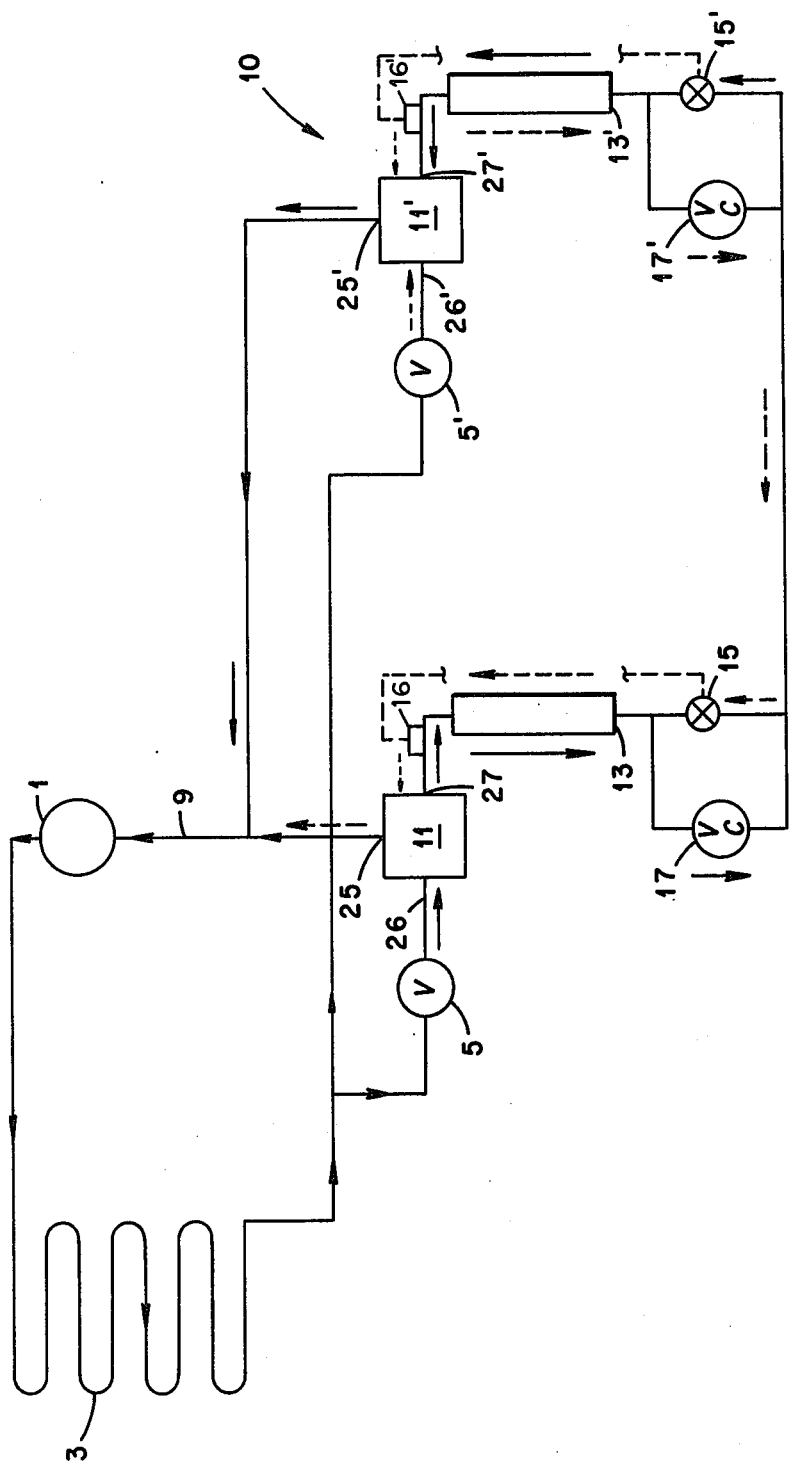
FIG. 1 is a schematic diagram of the system utilizing two identical bidirectional-flow valves 11 and 11', each designed in accordance with this invention.

Referring to FIG. 1, it will be assumed that the bidirectional valves 11 and 11' are both of the design illustrated in FIGS. 2 and 3. Assuming that solenoid valve 5 is open and solenoid valve 5' is closed, high-pressure liquid refrigerant enters the inlet 26 of valve 11 and displaces the slidable piston-and-disc assembly toward the valve seat 28, to the position shown in FIG. 2. That is, the movement of the assembly successively engages the valve disc 49 with the seat 28 and displaces the disc assembly 37 inwardly along the stem to a position where the discharge port 47 lies outward of the hub portion 39 and thus is uncovered (i.e., open for flow). Further displacement of the piston is prevented by engagement of the piston head and the hub 39 (see FIG. 2). With the valve so positioned, warm liquid from the valve inlet 26 flows through the axial passage 43, the stem port 47, the valve port 27, and then through the evaporator 13 (FIG. 1), de-icing the same. The liquid then passes through expansion valve 15', cooling the evaporator 13' to freeze ice thereon, as previously described. The resulting low-pressure gas discharge from evaporator 13' flows into the inlet-outlet port 27' of the valve 11'. Because solenoid valve 5' is closed, no high-pressure fluid is being introduced to the inlet 26' of valve 11', and consequently its piston assembly is in the biased position shown in FIG. 3. Thus, the incoming low-pressure gas from evaporator 13' is directed out through the valve outlet 25', from which it flows into the compressor suction line 9. In the next cycle, solenoid valve 5 is closed and solenoid valve 5' is opened, and the bidirectional valves reverse their functions, permitting flow through the loop 10 in the opposite direction (see dashed arrows). As a result, ice is harvested from evaporator 13' and is formed on evaporator 13.

The foregoing description of the invention is for the purpose of illustration, and it will be apparent to those versed in the art that various modifications can be made therein without departing from the scope of the appended claims. For example, the outer spring 55 may be omitted; however, this spring provides the advantage that the valve disc 49 is widely spaced from its seat 28 at the time that low-pressure gas is admitted to the valve inlet 27. Thus, gas pressure losses in the valve are minimized. If desired, the inner spring 51 can be designed to so bias the piston, but in that event that fluid admitted to port 27 must supply the force required to displace the disc assembly from the seat. Referring to ring 33, it will be apparent that various stop means may be substituted for the same. The sealing rings 35 and 41 may be of any suitable configuration and material. The bleed hole 45 permits the escape of liquid trapped between the piston head and housing when the valve moves to the position shown in FIG. 3, but this is not a critical feature.

What is claimed is:

1. A valve comprising:

a housing provided with an inlet port and an outlet port having a common axis and also provided with an inlet-outlet port defining a valve seat, a piston slidably fitted in said housing for movement along said axis and partitioning said housing into a first compartment including said inlet port and a second compartment including said outlet port and valve seat, the head of said piston confronting said inlet port and being formed with an axial passage communicating with a discharge port in the sidewall of the stem of said piston, a valve disc assembly carried by said piston, said assembly including a hub portion slidably engaging said stem and including a disc for sealably engaging said seat, means carried by said piston for resiliently biasing said disc assembly outwardly away from the piston head and means carried by said piston for limiting the outward movement of said disc assembly to a position where said hub portion sealably covers said discharge port, whereby admission to said inlet port of fluid at a selected pressure moves said piston toward said seat to a position where engagement of said disc assembly and said seat displaces said disc assembly inwardly along said stem and uncovers said discharge port.

2. The valve of claim 1 further including means mounted between said piston and said housing for resiliently biasing said piston toward said inlet port to a position where said disc is out of engagement of said seat.

3. The valve of claim 1 further including sealing means circumferentially mounted to the head of said piston for engagement with said housing.

4. The valve of claim 1 further including sealing means carried by said hub portion and circumferentially engaging said stem.

5. The valve of claim 1 wherein said axial passage extends for the length of said stem.

* * * * *